× 976783

United States Patent [19]
Kulich et al.

[11] 4,402,568
[45] Sep. 6, 1983

[54] METHOD AND APPARATUS FOR AN OPTICAL FOUR-GATE COUPLER

[75] Inventors: Vaclav Kulich; Herbert Michel; Hans-Hermann Witte, all of Munich, Fed. Rep. of Germany

[73] Assignee: Siemens Aktiengesellschaft, Berlin & Munich, Fed. Rep. of Germany

[21] Appl. No.: 232,659

[22] Filed: Feb. 9, 1981

[30] Foreign Application Priority Data

Mar. 21, 1980 [DE] Fed. Rep. of Germany ....... 3010971

[51] Int. Cl.³ .............................................. G02B 5/172
[52] U.S. Cl. .................................. 350/96.16; 156/159; 350/96.15
[58] Field of Search ............... 350/96.15, 96.16, 96.21, 350/96.22; 156/158, 159

[56] References Cited

U.S. PATENT DOCUMENTS

| 4,325,604 | 4/1982 | Witte .............................. 350/96.15 |
| 4,339,290 | 7/1982 | Winzer et al. ...................... 156/159 |
| 4,342,499 | 8/1982 | Hicks, Jr. ........................ 350/96.15 |

FOREIGN PATENT DOCUMENTS

| 54-116254 | 9/1979 | Japan ............................... 350/96.15 |
| 54-151048 | 11/1979 | Japan ............................... 350/96.15 |
| 55-157701 | 12/1980 | Japan ............................... 350/96.15 |
| 1569752 | 6/1980 | United Kingdom ............... 350/96.15 |

OTHER PUBLICATIONS

Hans-H. Witte and V. Kulich, "Planar Input-Output Couplers in Thick-Film Technology for Multimode Optical Fibers", Siemens Forsch.-u. Entwickl.-Ber., vol. 8, No. 3, 1979, pp. 141-143.
Witte, "New Optical Planar Coupler in a Data Bus System with Single Multimode Fibers", L'Onde Electrique, vol. 56, No. 12, Dec. 1976, pp. 607-608.
Auracher et al., "Optimized Layout for a Data Bus System Based on a New Planar Access Coupler", Applied Optics, vol. 16, No. 12, Dec. 1977, pp. 3140-3142.
Weidel et al., "Asymmetric T-Couplers for Fibre Optic Data Buses", Electronics Letters, vol. 16, No. 17, Aug. 1980, pp. 673-674.
Witte, "Passive T-Bus with Asymmetrical 4-Port Couplers", Fiber and Integrated Optics, vol. 3, Nos. 2-3, 1980, pp. 253-261.

Primary Examiner—John D. Lee
Attorney, Agent, or Firm—Hill, Van Santen, Steadman & Simpson

[57] ABSTRACT

Method and apparatus for an optical four-gate coupler wherein the junction between two large fiber optical waveguides of the same diameter are connected to a fiber optical waveguide having a smaller diameter and wherein a guide part is formed with a groove for engaging the small fiber optical waveguide and the distance from the center line of said groove to the edge of the guide is equal to the diameter of the larger waveguides so that the guide part and a detent can hold the two large waveguides and the smaller waveguide in aligned contacting positions and a cover plate fits over at least the two large waveguides. Such structure is then cut transverse to the center axis of the three waveguides and the ends are polished and then coupled together so as to provide an optical four-gate coupler. The modification comprises forming a groove having a width equal to the diameter of the larger fiber optical waveguide fibers and a depth which is equal to two times the diameter of a thick fiber plus one time the diameter of the smaller fiber and wherein a number of smaller fibers are placed in the bottom of the groove and the two larger fibers are placed into the groove on top of the smaller fibers and are pressed with a cover member against the smaller fibers so that at least one of the smaller fibers is in good aligned contact with one of the larger fibers.

28 Claims, 7 Drawing Figures

METHOD AND APPARATUS FOR AN OPTICAL FOUR-GATE COUPLER

BACKGROUND OF THE INVENTION

1. Field of the Invention

This invention relates in general to method and apparatus for an optical four-gate coupler which includes an incoming and out-going fiber optical waveguide of a first relatively large diameter and at least one additional large fiber and one smaller optical fiber are coupled together such that the fibers can be cut at the coupling point transverse to the axis of the fibers after which the ends are coupled together in an offset fashion so as to provide a four-gate optical coupler.

2. Description of the Prior Art

The publication entitled "Planar Input-Output Couplers In Thick-Film Technology for Multimode Optical Fibers" by H. H. Witte and V. Kulich, Siemens Forsch.-u-Entwickl.-Ber. Volume 8, No. 3, 1979, Pages 141–143 discloses optical four-gate couplers which have a pair of input multimode optical fibers connected to a pair of output fibers and in which the diameter of all the optical fibers are of equal size such that the degree of input coupling is equal to the degree of output coupling. If such couplers are employed in optical data buses with T network structures, this results in an output coupling loss which increases linearly with the number of subscribers.

SUMMARY OF THE INVENTION

Copending application Ser. No. 182,061 filed Aug. 28, 1980 entitled "Optical Four-Gate Coupler", assigned to the assignee of the present invention and in which the inventor is Hans H. Witte, (now U.S. Pat. No. 4,383,730) discloses four-gate optical couplers which have optical fibers of different diameters so as to vary the coupling between the fibers.

The present invention relates to apparatus and method for an optical four-gate coupler which includes the various fiber optical waveguides of a four-gate coupler having the flat end surfaces of the four fibers formed in one plane with their axes abutting one another with axial offset and the diameter of the fibers for coupling energy into the coupler being smaller than the diameter of the remaining fibers.

As is discussed and explained in copending application No. 182,061, the optical four-gate coupler can have the coupling losses significantly reduced relative to prior art couplers by providing that the fiber optical waveguide for coupling energy into the coupler has a smaller diameter than the remaining fibers. In addition, the degree of coupling into and out of the four-gate coupler can be selected according to the teaching of Ser. No. 182,061 independently and application No. 182,061 discloses certain arrangements for manufacturing four-gate couplers with fibers of different diameters.

It is an object of the present invention to provide the simplest methods for manufacturing a four-gate coupler of the type discussed above and these methods are particularly suited for mass production of four-gate couplers at low cost and wherein said couplers can be identical except for the coupling in and coupling out amounts.

The object of the invention is achieved by providing two of the fibers of the same diameter against a detent on a substrate and the fiber end of the fiber having a smaller cross-section than the other fibers is mounted in a guide part which has a holding groove with its center dimensioned from the end of the guide part half the diameter of the larger fibers.

In this method, a substrate which might consist of glass, for example, can be employed as the carrier plate for the four-gate coupler and the fiber of a first larger diameter is mounted on the substrate and placed against a detent and a second continuous thick fiber waveguide is placed adjacent to the first thick fiber waveguide. The detent, for example, can consist of a lamina bonded onto the substrate. A guide part is formed with a groove in which the smaller fiber waveguide is mounted such that the guide part causes the small diameter waveguide to engage the surface of one of the larger waveguides and the guide part has a length such that the small waveguide is aligned with the two large waveguides so that a plane can pass through the diameter of all three waveguides. All of the fibers are rigidly fixed in this position as, for example, by the use of an optical adhesive and then the element formed in this manner is cut on a plane at right angles to the axes of the fibers. The two cut surfaces are then polished so that they are flat and then are connected to each other with offset of the fibers as is discussed in copending application No. 182,061. The amount of the offset determines the coupling in and coupling out amounts that result. In the finished four-gate coupler, one fiber in each half has no optical function.

In a further development of the invention, the simultaneous manufacture of a large number of identical guide parts for the thin fibers occurs wherein, in a first step, guide channels for receiving the thin fibers are produced in a lamina. Such guide channels can be photolithographically produced with the use of a suitable mask. Subsequently, the lamina is cut parallel to the guide channels. Then the cut surfaces are ground to a degree such that the distance of the center of the guide channels from the ground edge corresponds to the radius of the larger fibers. By cutting such parts at right angles to the guide channels, a multitude of identical guide parts can be formed.

It is also advantageous for manufacturing identical guide parts to first cut a strip of a few millimeters in width from a lamina and to polish the cut surfaces so that they are flat. This assures that all of the polishing operations can be formed at one time on all of the strips. The edges formed in this manner serve as reference edges for a subsequent photolithographic process. A strip is placed against a detent edge, then one or two guidance channels for thin fibers are produced at the desired distance from the edge with the use of a mask. Subsequently, the strips can again be cut at right angles to the guide channels and a number of identical guide parts can be thus formed.

The lamina for the guide parts may consist of silicon or also could consist of a light sensitive material as, for example, a synthetic plastic. So as to increase the mechanical stability the lamina can be supported on a substrate and be rigidly connected to the substrate.

Another method of the invention for forming an optical four-gate coupler comprises forming a plurality of grooves in a plate at either the same time or at different times with the width of each of the grooves corresponding approximately to the diameter of the larger fibers and with the depth of the grooves being equal to two times the diameter of the larger fibers plus one time the diameter of the smaller fibers. A plurality of thin fibers are first placed in the grooves and then two thick fibers are put in the groove. By using a plurality of thin fibers, it is assured that at least one of the thin fibers will be aligned optimally with the large fiber such that the axis of the thin fiber lies approximately in a single plane with the axes of the two large diameter fibers. The fibers are placed in close contact with the use of a pressure lamina and are fixed in this position, for example, with an optical adhesive. Subsequently, the plate together with the fibers is cut at right angles to the fiber axes and the two end faces are polished smoothly and are again connected to each other with a suitable offset. The plate in which the grooves for the fibers are generated can consist, for example, of glass. However, it can also be made of silicon lamina bonded to a substrate. It is also possible that the plate consist of light-sensitive material and that the grooves be photolithographically formed.

It is provided in an advantageous further development of the inventive method that the end faces of opposing fiber ends which are connected to one another with offset are fixed to the substrate in guidance grooves with defined spacing. By cutting the plate parallel to the grooves for the fibers, a large number of identical four-gate couplers which are mechanically stable and in which the system of fibers can be flange mounted to the free end faces of the optically effective fibers in the coupler can be formed.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
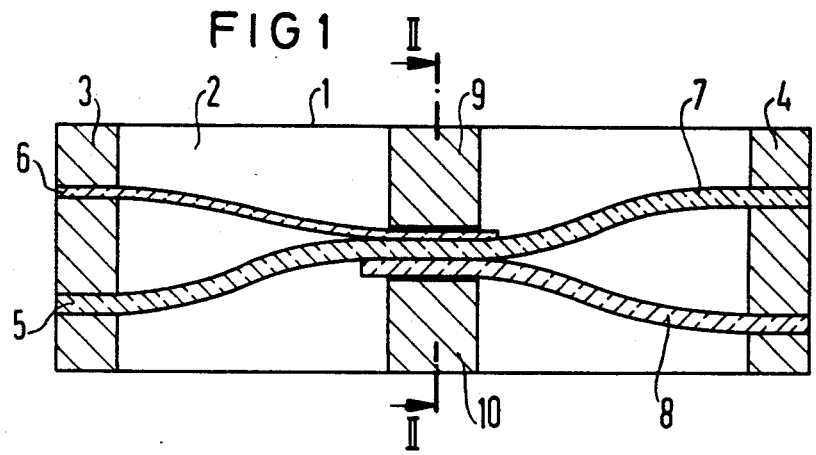
FIG. 1 is a top plan view illustrating the fiber optical waveguides.

The first embodiment is illustrated in FIG. 1 and consists of a substrate 2 which might be of glass, for example, on which a pair of lamina 3 and 4 formed with suitable guidance grooves for fixing the position of fiber optical waveguides at specific distances are mounted at each end. For example, the waveguide 5 having a relatively large diameter has one end mounted in a groove in the lamina 3 and extends the length of the substrate 2 through a detent 10 and guide part 9 and has a portion 7 which is mounted in a groove in the lamina 4. A large diameter waveguide 8 has one end fixed in a groove in the lamina 4 and its other end extends through the detent 10 and guide part 9 and terminates before the lamina 3. A fiber optical waveguide 6 of smaller diameter has its end 6 mounted in a groove in the lamina 3 and extends beyond the detent 10 and guide part 9 but its end terminates before the lamina 4.

Figure 2:
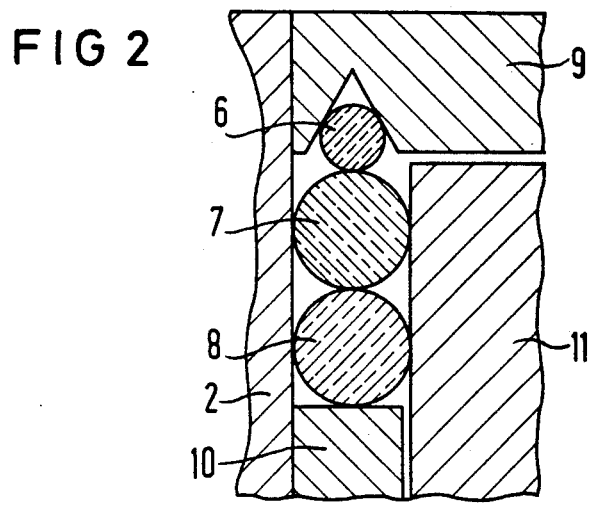
FIG. 2 is a sectional view along the line II—II from FIG. 1.

The guide part 9 receives the thin or small diameter fiber optical waveguide 6 and is bonded to the substrate 2 in the center of the structure 1. The continuing fiber having the fiber ends 5 and 7 and the end of fiber 8 are connected to the thin fiber 6 between the detent 10 and the guide part 9. A detent 10 engages the end of the fiber 8 of large diameter and the fiber 7 of large diameter is mounted adjacent the fiber 8 as shown in FIGS. 1 and 2 and the smaller diameter fiber 6 engages the fiber 7 and is held by the guide part 9. A cover member 11 is attached to the detent 10 as well as to the laminas 3 and 4 for completely fixing the fibers to the substrate. The arrangement can be joined with adhesive and after the adhesive has set the part 1 can be cut along the section line II—II. The ends of the cut surfaces can then be polished smoothly and then they can be joined together with suitable offset as described, for example, in application No. 182,061 so as to form a finished four-gate coupler. The polished ends are then bonded together with a suitable optical cement. One of the fibers in each of the two halves of the coupler has no optical function.

FIG. 2 illustrates in sectional view along the line II—II, but it is not to scale so as to illustrate the principles of the invention. As can be observed from FIG. 2, the three fibers 6, 7 and 8 are mounted with the guide part 9, the detent 10 and the cover member 11 so that their axes lie in a common plane.

Figure 3:
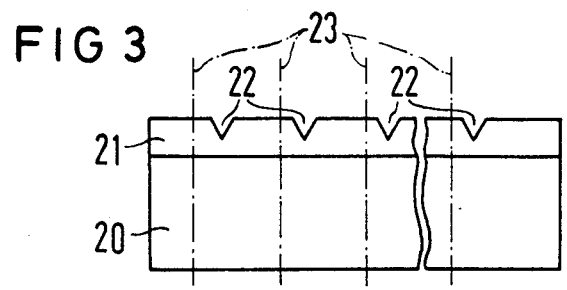
FIG. 3 is an end sectional view illustrating the method of forming the waveguide parts for the thin fibers.

FIG. 3 illustrates a possible way of manufacturing the guide part 9. First, a silicon lamina 21 is attached to a substrate 20. Guide channels 22 for receiving the thin fibers 6 are photolithographically produced in the silicon lamina by the use of a suitable mask. Then the silicon lamina and the substrate are cut in common along the cutting lines 23. The positions of the cutting planes 23 is determined from the center of the grooves 22 for receiving the smaller diameter fiber 6 and might, for example, be one millimeter from the center of the guide channels 22. After the cuts 23 have been made, the end surfaces of the substrate 20 and the lamina 21 are ground such that the distance from the cut 23 of the guide part to the center line of the groove 22 is equal to the radius of the fibers of large diameters 7 and 8.

Figure 4:
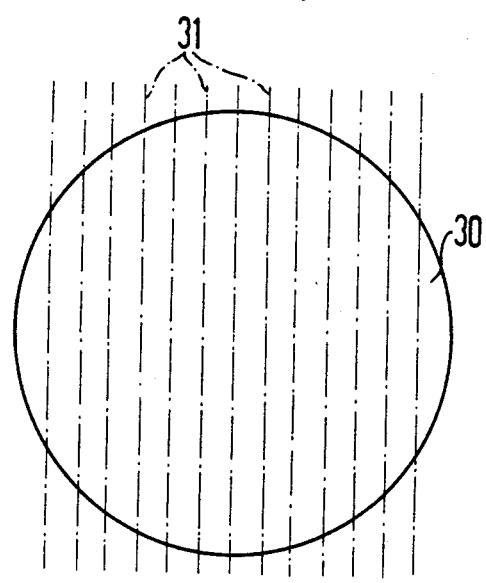
FIG. 4 also illustrates a step in forming the guide parts for the thin fibers.
Figure 5:
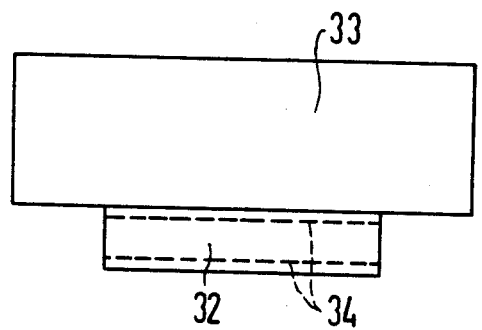
FIG. 5 illustrates a step of the method for forming the guide parts for the thin fibers.

In order to mass produce the guide parts, it is possible to utilize the following method. As shown in FIG. 4, a round disk 30 can be attached to a substrate of glass, not shown, in FIG. 4. Then strips approximately 5 mm in width can be cut from the silicon 30 and the substrate by sawing. The cutlines for the strips is illustrated in FIG. 4 by means of dot-dash lines 31. In a common processing step, the strips can be placed on top of each other and can be ground so that each strip has two parallel planar lateral surfaces. A strip 32 thus formed is illustrated in FIG. 5, and the opposite side surfaces of the strip 32 have been ground to provide two parallel planar surfaces. The planar lateral surfaces serve as dimension reference surfaces for a subsequent photolithographic process for creating the guide channels for the small diameter waveguide 6. For this purpose, the strip 32 is placed with one lateral surface against a stop member 33 and two guide channels 34 for small diameter fibers are photolithographically produced with the use of a mask not illustrated. As shown in FIG. 5, the guide channels 34 are only schematically illustrated as broken lines. The distance of the two guide channels 34 from the respective adjacent planar lateral surface which has been polished as described above is selected so that the center of the guide channel is equal to the radius of the large diameter fibers 7 and 8.

Each strip 32 is formed with two guide channels and then the strip 32 can be divided into two parts along its length by sawing approximately at its center line. This produces two laminas in which the guide channels are respectively placed a distance from one lateral surface by the desired spacing equal to the radius of the larger waveguides 7 and 8. By cutting each of the lamina at right angles to the guide channels, a corresponding number of guide parts for the small diameter fibers is produced. Instead of using silicon for the guide parts 9, a light sensitive material can also be used to form the guide parts according to the methods of FIGS. 3 through 5.

Figure 6:
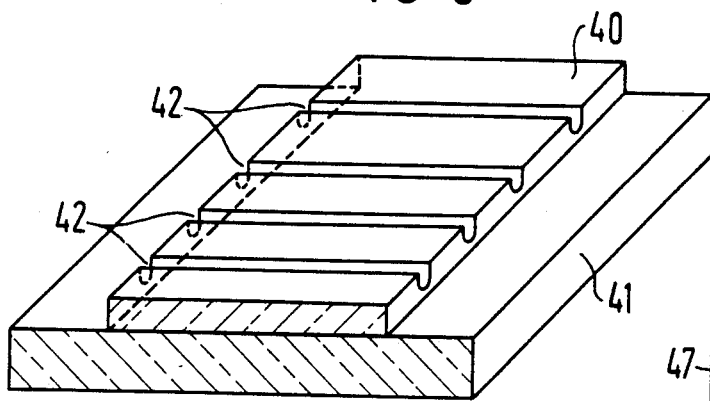
FIG. 6 illustrates a modified form of the invention for forming the elements of the four-gate coupler in a perspective view.
Figure 7:
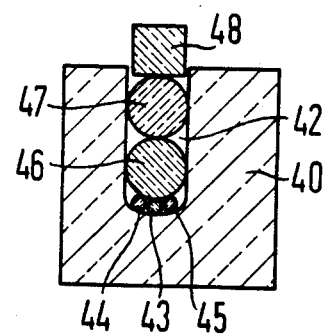
FIG. 7 is an enlarged sectional view showing the fiber optical waveguides inserted into the element illustrated in FIG. 6.

FIGS. 6 and 7 illustrate another method of forming four-gate couplers according to the invention. The glass plate 40 is bonded onto a substrate 41. A plurality of grooves 42 are sawed parallel to each other in the glass plate and as is shown in FIG. 7, the width of the grooves 42 is equal to the diameter of the larger diameter fibers 46 and 47. The depth of the groove 42 is equal to the diameter of the two large diameter waveguide fibers 46 and 47 plus the diameter of one of the small waveguide fibers 43. In assembly of the four-gate coupler, a plurality of small diameter waveguides 44, 43 and 45 are placed in the bottom of the groove 42 as shown in FIG. 7 and then a large diameter fiber 46 is placed on top of the small diameter fibers 43, 44 and 45 and then the second large diameter fiber 47 is placed on top of the large diameter fiber 46. Then a pressure lamina plate 48 is mounted to close the top of the groove 42 and an adhesive is used to fix the assembly together. It is to be noted that at least one of the small diameter fibers 43 will be centered on a plane passing through the centers of the large diameter fiber 46 and 47. Of course the structures thus formed are cut normal to the longitudinal axis of the fibers 46, 47, 43, 44 and 45, the ends are polished and the couplers are made as described above.

Although the invention has been described with respect to preferred embodiments, it is not to be so limited as changes and modifications can be made which are within the full intended scope of the invention as defined by the appended claims.

We claim as our invention:

1. An optical four-gate coupler with an in-coming optical fiber waveguide, an outgoing optical fiber waveguide, a thin coupling-in optical fiber waveguide and a coupling-out fiber optical waveguide, in which the planar end faces of the four fibers lie in one plane with their axes abutting one another with axial offset and the diameter of the coupling-in fiber is smaller than that of the other thick fibers, comprising a substrate, all of said fibers mounted together on said substrate, a detent, said thick fiber at the outside resting against said detent, a guide part and a thin fiber (6) mounted in said guide part (9).

2. An optical four-gate coupler according to claim 1, characterized in that the substrate consists of glass.

3. An optical four-gate coupler according to claim 1 characterized in that said guide part (9) consists of a substrate (20) and a material layer (21) with guide channels (22) connected to said substrate (20).

4. An optical four-gate coupler according to claim 3 characterized in that said substrate (20) of the guide part (9) consists of glass.

5. An optical four-gate coupler according to claim 3, characterized in that the material (21) of the guide part (9) connected to the substrate (20) consists of silicon.

6. An optical four-gate coupler according to claim 3, characterized in that the material (21) of the guide part (9) connected to the substrate (20) consists of light sensitive material.

7. An optical four-gate coupler according to claim 3, characterized in that the material (21) of the guide part (9) connected to the substrate (20) consists of light sensitive synthetic material.

8. An optical four-gate coupler according to claim 1 wherein a cover (11) is attached to the thick fibers (5, 7, 8) and to the detect (10) for fixing the elements together.

9. An optical four-gate coupler with in-coming optical fiber waveguide, an out-going optical fiber waveguide, a thin coupling-in optical fiber waveguide and a coupling-out optical fiber waveguide, in which the planar end faces of the four fibers lie in one plane with their axes abutting one another with axial offset and the diameter of the coupling-in fiber is smaller than that of the other fibers, comprising a plate (40), grooves (42) formed in said plate (40), said thin and thick fibers mounted lamina (48) and fixing the elements in position, cutting the plate (40) at right angles to the fibers (43 through 47), polishing the two end faces smooth, and connecting them to one another with the required axial offset.

10. An optical four-gate coupler according to claim 9, characterized in that the plate (40) consists of glass.

11. An optical four-gate coupler according to claim 9, characterized in that the plate (40) consists of silicon.

12. An optical four-gate coupler according to claim 9, characterized in that the plate (40) consists of light-sensitive material.

13. An optical four-gate coupler according to claim 9, characterized in that the plate (40) consists of light-sensitive synthetic material.

14. An optical four-gate coupler according to claim 9, wherein said plate (40) is connected to a substrate (41).

15. An optical four-gate coupler according to claim 9, characterized in that the two end faces of the fiber ends of said fibers facing away from each other and which are connected with offset are fixed in guide grooves having defined spacing.

16. A method for manufacturing an optical four-gate coupler with an in-coming fiber optical waveguide, an out-going fiber optical waveguide, a coupling-in fiber optical waveguide and a coupling-out fiber optical waveguide, in which the flat end faces of the four fibers lie in one plate with their axes abutting one another and axially offset and the diameter of the coupling-in optical fiber is smaller than that of the remaining fibers, comprising the steps of mounting one fiber end (8) and a continuing fiber (5, 7) having the same diameter against a detent (10) on a substrate (2), mounting the fiber end of a fiber (6) of a smaller diameter which extends toward said one fiber and said continuing fiber (8 and 5, 7) in a guide part (9) and fixing all fibers in position, cutting the assembled element (1) at right angles to the axes of said fibers, polishing the two end surfaces of said cut fibers until they are smooth, and connecting the two end surfaces to each other with a required offset.

17. A method for manufacturing an optical four-gate coupler according to claim 16 including forming guide channels (22) for the acceptance of the thin fibers in a lamina (21), cutting said lamina (21) parallel to the guide channels (22) at a distance from the center of said channels which is slightly greater than the radius of the thicker fibers, and grinding said lamina so that the required distance of the center of the channels (22) from the ground surface is obtained.

18. A method according to claim 17 characterized in that the lamina (21) consists of silicon.

19. A method according to claim 17 characterized in that the lamina consists of a light-sensitive material.

20. A method according to claim 17 characterized in that the lamina (21) is supported on a substrate (20) and is permanently connected thereto.

21. A method according to claim 17 comprising attaching a cover (11) to the laminae (3, 4), the detent (10) and the thick fibers (5, 7, 8) to form a unitary structure.

22. A method for manufacturing an optical four-gate coupler according to claim 16 comprising cutting strips (32) having a few millimeters width from a lamina (30) and grinding the cut surfaces smooth, and placing a strip (32) thus formed against a detent edge (33), forming one or two guide channels (34) for thin fibers photolithographically with a mask, and cutting the strips at right angles to the channels and, approximately at the center between the channels into a multitude of identical guide parts.

23. A method according to claim 22 wherein the lamina (30) consists of silicon.

24. A method according to claim 22 wherein the lamina consists of a light sensitive material.

25. A method according to claim 16 characterized in that the end faces of the fiber ends facing away from one another and which are connected together with offset are fixed on the substrate (2) in guide grooves having defined spacing.

26. A method for manufacturing an optical four-gate coupler with an in-coming fiber optical waveguide, an out-going fiber optical waveguide, a coupling-in fiber optical waveguide and a coupling-out fiber optical waveguide, in which the planar end faces of the four fibers lie in one plane with their axes abutting one another and axially offset and the diameter of the coupling-in fiber is smaller than that of the remaining fibers, comprising the steps of cutting at least one groove (42) in a plate (40) with the width of said groove being approximately equal to the diameter of the thicker fibers and the depth being approximately equal to twice the diameter of the thicker fibers plus one time the diameter of the smaller fibers, inserting a plurality of smaller fibers (43 through 45) in said groove (42), inserting two thicker fibers (46 and 47) in said groove, applying a pressure in said grooves (42) and a pressure lamina (48) attached to said fibers and plate to hold them in said grooves (42).

27. A method according to claim 26 characterized in that the plate (40) consists of glass.

28. A method according to claim 26 characterized in that the plate consists of light-sensitive material and the grooves are photolithographically produced.

* * * * *